(12) United States Patent
Brodt et al.

(10) Patent No.: US 9,501,534 B1
(45) Date of Patent: Nov. 22, 2016

(54) EXTREME VALUE COMPUTATION

(71) Applicant: INTERNATIONAL BUSINESS MACHINES CORPORATION, Armonk, NY (US)

(72) Inventors: Andreas Brodt, Gerlingen (DE); Oliver Schiller, Dettingen (DE); Marc Schwind, Holzgerlingen (DE); Knut Stolze, Hummelshain (DE); Mathias Trumpp, Ulm (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/008,960

(22) Filed: Jan. 28, 2016

(51) Int. Cl.
G06F 17/30 (2006.01)

(52) U.S. Cl.
CPC ..... *G06F 17/3053* (2013.01); *G06F 17/30333* (2013.01)

(58) Field of Classification Search
None
See application file for complete search history.

(56) References Cited

U.S. PATENT DOCUMENTS

| | | | |
|---|---|---|---|
| 8,209,294 B2 | 6/2012 | Shankar et al. | |
| 8,521,748 B2 | 8/2013 | Slezak et al. | |
| 8,943,100 B2 | 1/2015 | Slezak et al. | |
| 8,996,544 B2 | 3/2015 | Ziauddin et al. | |
| 2010/0153429 A1* | 6/2010 | Xu | G06F 17/30418 707/769 |
| 2011/0078177 A1* | 3/2011 | Fakeih | G06F 17/30548 707/769 |
| 2012/0117054 A1* | 5/2012 | Shrinivas | G06F 17/30469 707/713 |
| 2012/0197866 A1* | 8/2012 | Xu | G06F 17/30412 707/713 |
| 2015/0088812 A1 | 3/2015 | Ziauddin et al. | |
| 2016/0092507 A1* | 3/2016 | Ng | G06F 17/30445 707/610 |

OTHER PUBLICATIONS

Chachuat, "Nonlinear and Dynamic Optimization from Theory to Practice", IC-32: Winter Semester 2006/2007.*
Boehme et al., "Method for Storing a Dataset," Application and Drawings, Filed on Nov. 18, 2015, p. 1-43, U.S. Appl. No. 14/944,256.
Lamb et al., "The Vertica Analytic Database: CStore 7 Years Later," Proceedings of the VLDB Endowment, 2012, p. 1790-1801, vol. 5, No. 12.
Oracle, "Using Zone Maps," Oracle® Database Data Warehousing Guide, Nov. 2014, p. 1-24, Chapter 13, 12c Release 1 (12.1), E41670-08.

* cited by examiner

*Primary Examiner* — Khanh Pham
(74) *Attorney, Agent, or Firm* — Michael O'Keefe

(57) ABSTRACT

Determining an extremum value of an attribute of a first data table. The first data table includes a set of data blocks. Assigning each data block of the set of data blocks an attribute value information indicative of a range of values of the attribute. Assigning the attribute value information results in an extremum set of indicative maximum and minimum values of the attribute. Determining a reference value as the infimum or supremum of the extremum set. If the extremum is a minimum, selecting a subset of the set of data blocks, each having a respective minimum value of the attribute smaller than the reference value. If the extremum is a maximum, selecting a subset of the set of data blocks, each having a respective maximum value of the attribute higher than the reference value. Processing at least part of the subset of data blocks for identifying the extremum value.

20 Claims, 5 Drawing Sheets

EXTREME VALUE COMPUTATION

BACKGROUND

The present invention relates to the field of digital computer systems, and more specifically, to a method for determining extremum values in a dataset.

Analytical database systems manage very large amounts of data and are optimized for queries that may read large fractions of it. At the same time, they offer the complete querying power of Structured Query Language (SQL). As such systems do not focus on online transaction processing (OLTP) load (i.e. involving point queries) they typically do not index each data row but heavily rely on scan performance. A typical task of analytical database queries is to compute aggregates on large data sets, such as the minimum or maximum value.

SUMMARY

Various embodiments provide a method for determining extremum values in a dataset, computer system and computer program product as described by the subject matter of the independent claims. Advantageous embodiments are described in the dependent claims. Embodiments of the present invention can be freely combined with each other if they are not mutually exclusive.

According to one embodiment, a method for determining an extremum value of an attribute of a first data table is provided, whereby the first data table includes at least a set of data blocks. The method may include assigning, by a computer, to each data block of a set of data blocks a plurality of attribute value information indicative of a range of a plurality of values of an attribute in the data block, whereby assigning results in an extremum set of a plurality of indicative maximum values of the attribute and a plurality of indicative minimum values of the attribute. The method may also include determining a reference value as an infimum or a supremum of the extremum set based on each extremum in the extremum set. The method may further include, in case the extremum is a minimum, selecting a subset of the set of data blocks, whereby each data block within the subset has a respective minimum value of the attribute that is smaller than the reference value. The method may also include, in case the extremum is a maximum, selecting a subset of the set of data blocks, whereby each data block within the subset has a respective maximum value of the attribute that is higher than the reference value. The method may further include processing at least a part of the selected subset of data blocks for identifying an extremum value.

According to another embodiment, a computer system for determining an extremum value of an attribute of a first data table is provided, whereby the first data table includes at least a set of data blocks. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The computer system may include assigning to each data block of the set of data blocks a plurality of attribute value information indicative of a range of values of an attribute in the data block, whereby assigning results in an extremum set of a plurality of indicative maximum values and a plurality of indicative minimum values of the attribute. The computer system may also include determining a first reference value as a supremum of the extremum set. The computer system may further include determining a second reference value as an infimum of the extremum set. The computer system may also include selecting a first subset of the set of data blocks, whereby each data block within the first subset has a respective minimum value of the attribute that is smaller than the first reference value. The computer system may further include selecting a second subset of the set of data blocks, whereby each data block within the second subset has a respective maximum value of the attribute that is higher than the second reference value. The computer system may also include processing at least part of the first subset or at least a part of the second subset for identifying a plurality of extremum values.

According to yet another embodiment, a computer program product for determining an extremum value of an attribute of a first data table is provided, whereby the first data table includes at least a set of data blocks. The computer program product may include one or more computer-readable storage devices and program instructions stored on at least one of the one or more tangible storage devices, the program instructions executable by a processor. The computer program product may include program instructions to assign to each data block of the set of data blocks a plurality of attribute value information indicative of a range of a plurality of values of an attribute in the data block, whereby assigning results in an extremum set of a plurality of indicative maximum values and a plurality of indicative minimum values of the attribute. The computer program product may also include program instructions to determine a reference value as an infimum or a supremum of the extremum set based on each extremum in the extremum set. The computer program product may further include, in case the extremum is a minimum, program instructions to select a subset of the set of data blocks, whereby each data block within the subset has a respective minimum value of the attribute that is smaller than the reference value. The computer program product may also include, in case the extremum is a maximum, program instructions to select a subset of the set of data blocks, whereby each data block within the subset has a respective maximum value of the attribute that is higher than the reference value. The computer program product may also include program instructions to process at least a part of the subset of data blocks for identifying an extremum value.

BRIEF DESCRIPTION OF THE SEVERAL VIEWS OF THE DRAWINGS

In the following embodiments of the invention are explained in greater detail, by way of example only, making reference to the drawings in which.

DETAILED DESCRIPTION

Figure 1:
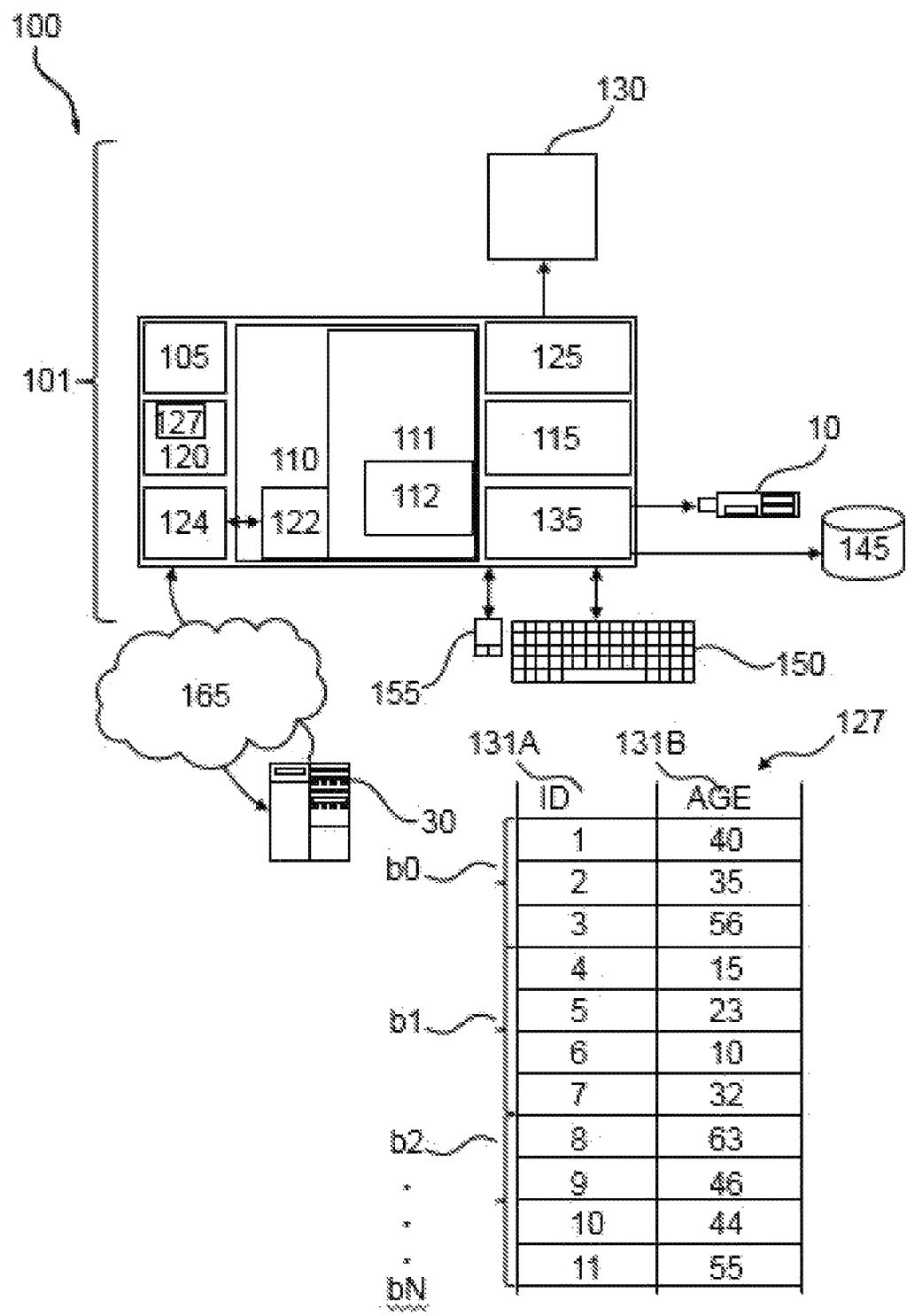
FIG. 1 represents a computerized system, suited for implementing one or more method steps as involved in the present disclosure.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present method may preselect only those data blocks that potentially contain the minimum or maximum and subsequently scan only those preselected data blocks in order to find the extremum values. This may save processing resources compared to the case where the whole dataset is scanned in order to identify the extremum values. In particular, the present method may speed up the process of finding extremum values. This may particularly be advantageous in case of data blocks stored on a disk storage type and/or in case of data blocks of a large data structure, such as Big Data. This is in contrast to conventional methods where selecting the minimum or maximum value of a table column requires to look at all rows, i.e. a full table scan—to find the one smallest or largest row. This may of course be very expensive, especially considering the fact that tables in analytical database systems not infrequently grow up to terabytes in size.

The term "disk" as used herein may include a hard disk drive (HDD), a direct access storage device (DASD) or a logical unit number (lun) in a storage device. The term "disk" is intended to embrace not only magnetic storage devices, but also optical, solid state, and other types of storage devices.

The term "infimum" refers to the greatest lower bound e.g. in the extremum set. In other words, the term "infimum" refers to the largest value of the minimum values in the extremum set.

The term "supremum" refers to the least upper bound. In other words, the term "supremum" refers to the smallest value of the maximum values in the extremum set.

The term "extremum" refers to minimum or maximum.

According to one embodiment, in case the extremum is a minimum the processing of the subset of data blocks includes: processing a current data block of the subset of data blocks only in response to determining that the minimum value of the attribute of the current data block is smaller than a minimum value of a previously processed data block of the subset of data blocks. The minimum value of the previously processed data block of the subset of data blocks may be a current minimum value of the processed data block that is determined when processing that data block.

According to one embodiment, in case the extremum is a maximum the processing of the subset of data blocks includes: processing a current data block of the subset of data blocks only in response to determining that the maximum value of the attribute of the current data block is higher than a maximum value of a previously processed data block of the subset of data blocks. The maximum value of the previously processed data block of the subset of data blocks may be a current maximum value of the processed data block that is determined when processing that data block.

These embodiments may have the advantage of further saving processing resources as the number of processed data blocks is further reduced.

According to one embodiment, in case the extremum is a minimum, the processing of the subset of data blocks includes: s1) sorting in an ascending order the subset of minimum values of the respective subset of data blocks, and s2) processing the first ordered data block for identifying the minimum value and s3) in case the identified minimum value is smaller than the minimum value of the following data block, using the identified minimum value as the extremum value to be determined, otherwise, repeating steps s2)-s3) for the subsequent ordered data block.

According to one embodiment, in case the extremum is a maximum the processing of the subset of data blocks includes: p1) sorting in a descending order the subset of maximum values of the respective subset of data blocks, and p2) processing the first ordered data block for identifying the maximum value and p3) in case the identified maximum value is higher than the maximum value of the following data block, using the identified maximum value as the extremum value to be determined, otherwise, repeating steps p2)-p3) for the subsequent ordered data block.

The remaining ordered data blocks may be skipped. These embodiments may have the advantage of further saving processing resources as the number of processed data blocks is further reduced by the present method. This may particularly be advantageous in case the data blocks are previously ordered or exist in an ordered format.

According to one embodiment, the method further includes: receiving a query for determining the extremum value, the query indicating a predefined condition on an attribute of the first data table, the selecting of the subset of data blocks further includes: in response to determining that the subset of data blocks does not additionally satisfy the predefined condition, repeating steps b)-c) using the extremum set without extremum values of the subset of data blocks, the repeating is performed until at least part of the subset of data blocks satisfies the predefined condition or until all data blocks of the first data table have been processed.

This embodiment may provide a reliable method that may enable an accurate determination of the extremum values. For example, the determined extremum values may be used to control a computer system so as to prevent an overload of the computer system (e.g. due to the large range of values to be processed by the computer system) by configuring the computer system according to the determined extremum values. For example, if a computer system underestimates the range of values of a given dataset to be processed it may allocate less processing resources than required for processing the dataset which may lead to a system crash or congestion. Thus, an accurate determination of the extremum values may be advantageous.

According to one embodiment, the method further includes: receiving a request for determining the extremum value of the attribute in a joined table resulting from a join of the first data table and a second data table, the processing includes: joining the subset of data blocks with the second data table, the joining resulting in the at least part of the subset of the data blocks; in response to determining that the at least part of the subset of data blocks is empty repeating steps b)-c) using the extremum set without extremum values of the subset of data blocks. The repeating is performed until the at least part of the subset of data blocks is not empty or until all data blocks of the first data table have been processed.

According to one embodiment, the first data table being stored on a disk storage. The present method may particularly be advantageous in case the data blocks are stored on the disk, because data transfer from the disk may be much slower than on other storage devices and thus may consume processing time.

According to one embodiment, the first data table is an in-memory data table. This embodiment may have the advantage described above as the number of data blocks to be processed is reduced.

According to one embodiment, the processing of the first and second subsets of the data blocks includes: determining common data blocks between the first and second subsets of data blocks; processing the common data blocks for identifying both minimum and maximum values, thereby obtaining a first minimum value and a first maximum value; processing the first subset of data blocks excluding the common data blocks for identifying a second minimum value; processing the second subset of data blocks excluding the common data blocks for identifying a second maximum value; selecting the smallest one of the first and second minimum values and the largest one of the first and second maximum values.

This embodiment may have the advantage of further saving processing resources as the number of processed data blocks is further reduced by the present method.

FIG. 1 represents a general computerized system, suited for implementing method steps as involved in the disclosure.

It will be appreciated that the methods described herein are at least partly non-interactive, and automated by way of computerized systems, such as servers or embedded systems. In exemplary embodiments though, the methods described herein can be implemented in a (partly) interactive system. These methods can further be implemented in software 112, 122 (including firmware 122), hardware (processor) 105, or a combination thereof. In exemplary embodiments, the methods described herein are implemented in software, as an executable program, and is executed by a special or general-purpose digital computer, such as a personal computer, workstation, minicomputer, or mainframe computer. The most general system 100 therefore includes a general-purpose computer 101.

In exemplary embodiments, in terms of hardware architecture, as shown in FIG. 1, the computer 101 includes a processor 105, memory 110 coupled to a memory controller 115, and one or more input and/or output (I/O) devices (or peripherals) 10, 145 that are communicatively coupled via a local input/output controller 135. The input/output controller 135 can be, but is not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 145 may generally include any generalized cryptographic card or smart card known in the art.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macro-processor, or generally any device for executing software instructions.

The memory 110 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM). Note that the memory 110 can have a distributed architecture, where various components are situated remote from one another, but can be accessed by the processor 105.

The software in memory 110 may include one or more separate programs, each of which includes an ordered listing of executable instructions for implementing logical functions, notably functions involved in embodiments of this invention. In the example of FIG. 1, software in the memory 110 includes instructions 112 for implementing method for identifying dependencies between components.

The software in memory 110 shall also typically include a suitable operating system (OS) 111. The OS 111 essentially controls the execution of other computer programs, such as possibly software 112 for implementing methods as described herein.

The methods described herein may be in the form of a source program 112, executable program 112 (object code), script, or any other entity including a set of instructions 112 to be performed. When a source program, then the program needs to be translated via a compiler, assembler, interpreter, or the like, which may or may not be included within the memory 110, so as to operate properly in connection with the OS 111. Furthermore, the methods can be written as an object oriented programming language, which has classes of data and methods, or a procedure programming language, which has routines, subroutines, and/or functions.

In exemplary embodiments, a conventional keyboard 150 and mouse 155 can be coupled to the input/output controller 135. Other output devices such as the I/O devices 145 may include input devices, for example but not limited to a printer, a scanner, microphone, and the like. Finally, the I/O devices 10, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 145 can be any generalized cryptographic card or smart card known in the art. The system 100 can further include a display controller 125 coupled to a display 130. In exemplary embodiments, the system 100 can further include a network interface for coupling to a network 165. The network 165 can be an IP-based network for communication between the computer 101 and any external server, client and the like via a broadband connection. The network 165 transmits and receives data between the computer 101 and external systems 30, which can be involved to perform part or all of the steps of the methods discussed herein. In exemplary embodiments, network 165 can be a managed IP network administered by a service provider. The network 165 may be implemented in a wireless fashion, e.g., using wireless protocols and technologies, such as WiFi, WiMax, etc. The network 165 can also be a packet-switched network, such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the software in the memory 110 may further include a basic input output system (BIOS) 122. The BIOS is a set of essential software routines that initialize and test hardware at startup, start the OS 111, and support the transfer of data among the hardware devices. The BIOS is stored in ROM so that the BIOS can be executed when the computer 101 is activated.

When the computer 101 is in operation, the processor 105 is configured to execute software 112 stored within the memory 110, to communicate data to and from the memory 110, and to generally control operations of the computer 101 pursuant to the software. The methods described herein and the OS 111, in whole or in part, but typically the latter, are read by the processor 105, possibly buffered within the processor 105, and then executed.

When the systems and methods described herein are implemented in software 112, as is shown in FIG. 1, the methods can be stored on any computer readable medium, such as storage 120, for use by or in connection with any computer related system or method. The storage 120 may include a disk storage such as HDD storage.

The storage 120 may include at least one data table (or dataset) 127. For example, the data software 112 may receive (automatically or upon request) as input the data table 127, or may download the data table 127 from storage 120.

The data table 127 may include one or more columns 131A-N, whereby each column is represented by a respective attribute (e.g. "ID" 131A and "Age" 131B). The rows of the data table 127 may include values of the attributes. The data table 127 may for example include multiple data blocks b0-bN. For example, the data blocks b0-bN and may be created before or while executing the present method. While FIG. 1 only shows a few attributes and data blocks, it will be appreciated that numerous attributes and/or data blocks may exist or may be used.

Figure 2:
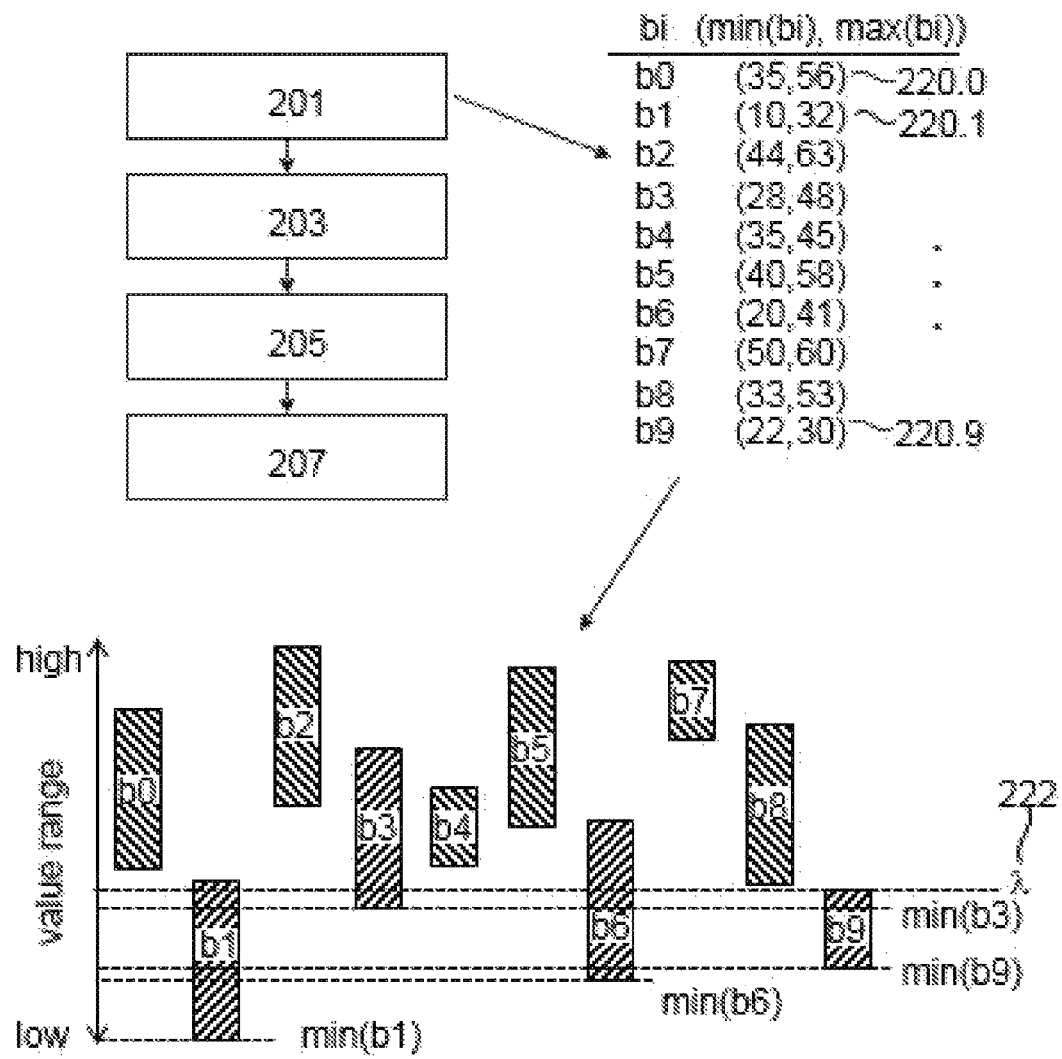
FIG. 2 is a flowchart of a method for determining a minimum value of an attribute in a data table.

FIG. 2 is a flowchart of a method for determining a minimum value (e.g. global minimum of the set of data blocks b0-b9) of an attribute e.g. 131B of data table 127. FIG. 2 shows for exemplification purpose that the data table 127 includes a set of 10 data blocks. For example, the minimum value may be determined for data stored in the data table 127.

In step 201, each data block of the set of data blocks b0-b9 may be assigned an attribute value information indicative of a range of values 220.0-9 of the attribute 131B in the data block. For example, the attribute value information may be created at a given time t0. At time t0 attribute value information includes the range of values e.g. 220.0-9 namely the minimum and the maximum values of the attribute in a given data block. However, at a subsequent time t1 it may happen that the content of the given data block has changed or updated. In this case, the attribute value information indicate the lower and upper bound of the values of the attribute 131B of the given data block. The assigning of the attribute value information to each of the set of data blocks results in an extremum set 220.0-9 of indicative maximum and minimum values of the attribute 131B. As shown in FIG. 2, the set of indicative maximum and minimum values is referred to as 220.0-9. For example, data block b0 has a minimum value or a lower bound of the "Age" 131.B of 35 and a maximum value or upper bound of that attribute 131B of 56.

For example, the assigning or providing of the attribute value information may include generating a multidimensional data structure for representing the set of data blocks b0-b9. For each data block e.g. b1 of the set of data blocks b0-b9 a respective data element may be added into the multidimensional data structure, whereby the data element has values e.g. 220.1 of data block b1 indicative of the attribute 131B.

The term multidimensional data structure refers to a data structure for indexing multidimensional information. The multidimensional data structure may for example represent a map that is viewed as a two dimensional image, whereby points on the map are stored as data elements on the multidimensional data structure. The multidimensional data structure supports various types of queries, e.g. a range query. For example, the multidimensional data structure includes a spatial index. The spatial index may be used to divide the indexed space (space defined by the multiple values of the attribute and covering the data elements of the spatial index) into search rectangles (or index rectangles) each includes a respective number of data elements. For example, a search rectangle may be defined by a lower left corner and an upper right corner. In case, the multiple attribute values assigned to a given data element include the minimum and maximum values of the first attribute in the respective data block, the lower left corner may be defined by the lowest minimum and maximum values of the requested range and the upper right corner may be defined by the highest minimum and maximum values of the requested range. Using this data structure only search rectangles that are covered by the query area may be searched. A search rectangle is either completely contained in, partially overlapping with, or disjoint with the query area. If a search rectangle is contained in the query area, then all its contained data elements are part of the query result. As no individual evaluation may be required, a big improvement over the conventional evaluation methods may be reached. Data elements in search rectangles that the query area partly covers may be evaluated individually. Search rectangles that are disjoint with the query area may be ignored. The query area is defined by two or more cuts on respective attribute values of the multiple attribute values.

In step 203, a first reference value $\lambda$ 222 may be determined as the smallest value of the set of maximum values max(b0)-max(b9) (also referred to as supremum) of the extremum set. The set of maximum values max(b0)-max(b9) may be ordered so as to identify or select the first reference value as the smallest of the set of maximum values. As shown in FIG. 2 the smallest maximum value is max(b9) the maximum value of the data block b9 referred to as $\lambda$ 222. For example, step 203 may be performed by reading the multidimensional data structure e.g. from the memory 110 or storage 120.

The data block b9 that corresponds to the determined first reference value contains at least one row or entry having an attribute value of the attribute 131B that is equal to or less than $\lambda$ 222. The determined $\lambda$ 222 may thus be an upper bound for the minimum value (or global minimum) of the set of data blocks b0-b9 to be determined. For example, it may be determined that the data block b9 contains the at least one row using metadata or information provided by the computer system. In another example, it may be determined that the data block b9 contains the at least one row by scanning the data block b9.

In step 205, a first subset (b1, b3, b6, and b9) of data blocks may be selected among the set of data blocks b0-b9. Each of the first subset of the set of data blocks has a respective minimum value of the attribute that is smaller than the first reference value $\lambda$ 222. For example, the first subset of data blocks may include data blocks b1, b3, b6 and b9 as they have respective minimum values min(b1), min(b3), min(b6) and min(b9) smaller than $\lambda$ 222.

In step 207, at least part of the first subsets of data blocks b1, b3, b6, and b9 may be processed for identifying the minimum value of the set of data block b0-b9. In other words, in order to determine the minimum values of the whole set of blocks b0-b9 only those determined first subset of data blocks are scanned for determining the minimum value of the set of data blocks b0-b9. This may have the advantage of saving processing resources compared to the case where the whole data table 127 is to be processed.

The processing of step 207 may for example be performed as follows. Assuming for example that the processing is performed e.g. in a random order, starting from b3, b1, b6 and then b9. After processing b3 and before processing b1 it may be determined if the minimum of the attribute 131B in data block b1 min(b1) is smaller than min(b3) which is the current minimum value of the attribute found in b3 after being processed. Since min(b1) is smaller than current min(b3) data block b1 may be processed or scanned for determining the minimum value of the set of data blocks b0-b9. After processing b1 (e.g. and current min(b1) may be determined which may be equal to the min(b1) in the attribute value information) and before processing b6 it may be determined if the minimum of the attribute 131B in data block b6 min(b6) is smaller than min(b1) (because min(b1) is the smallest minimum of the previously processed data blocks b3 and b1). Since min(b6) is higher than min(b1) data block b6 may not be processed or scanned (i.e. skipped) for determining the minimum value of the set of data blocks b0-b9. Before processing b9 it may be determined if the minimum of the attribute 131B in data block b9 min(b9) is smaller than min(b1) or not. Since min(b9) is higher than min(b1) data block b9 may not be processed or scanned (i.e. skipped) for determining the minimum value of the set of data blocks b0-b9. In this case, only data blocks b3 and b1 have been scanned instead of b1, b3, b6, and b9 to determine the minimum value of the set of data blocks b0-b9. This may further save processing resources.

In another example, the processing of step 207 may be performed as follows. The minimum values min(b1), min(b3), min(b6) and min (b9) of first subsets of data blocks b1, b3, b6 and b9 may be sorted in ascending order (b1--> b3-->b6-->b9). In this case, the first ranked or ordered data block b1 may be processed or scanned in order to determine the minimum value of the attribute 131B in data block b1 and if the current minimum value min(b1) is smaller than min(b3) then this min(b1) is the minimum value of the set of data blocks b0-b9 otherwise b3 is processed and compared with b6 and so on.

Figure 3:
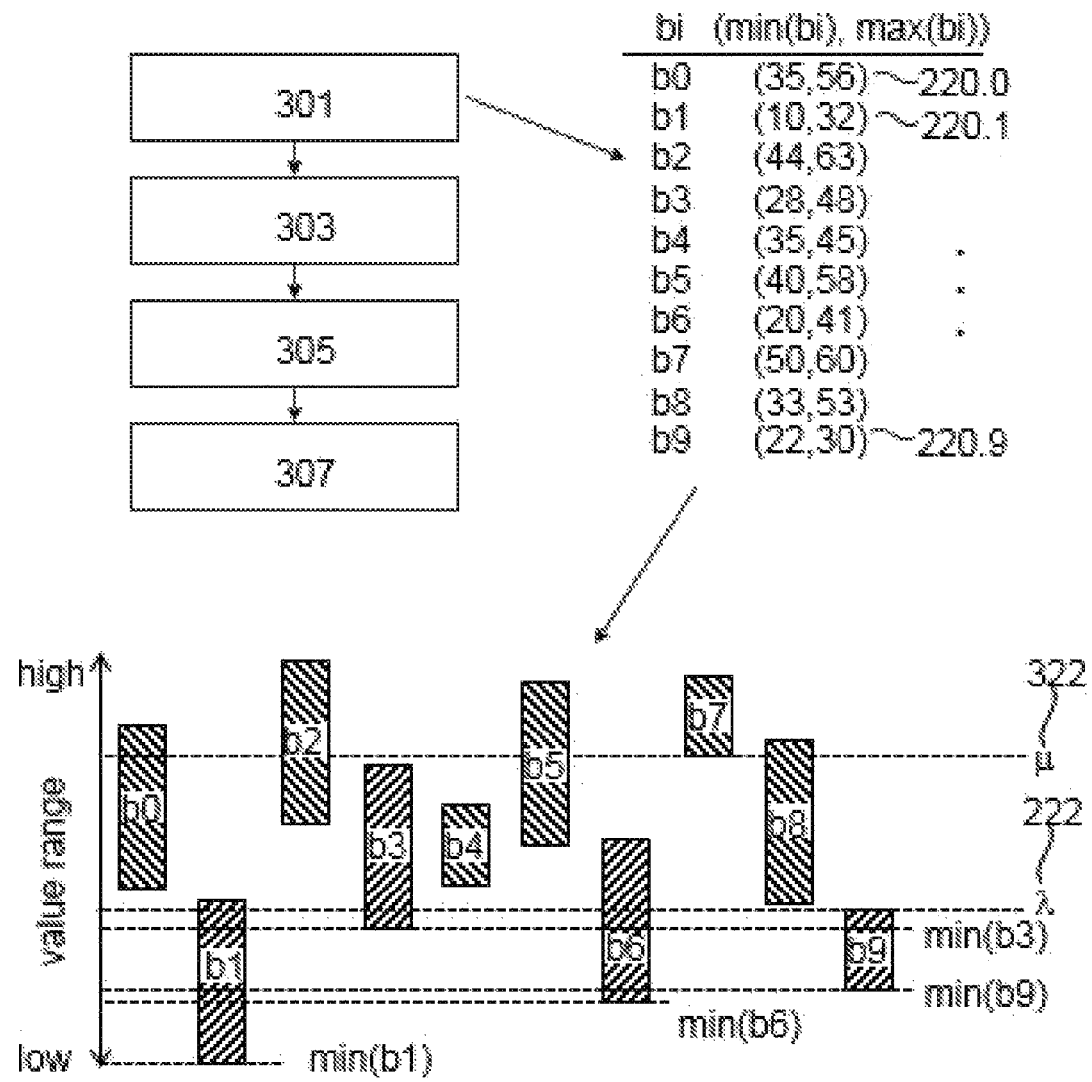
FIG. 3 is a flowchart of a method for determining a maximum value of an attribute in a data table.

FIG. 3 is a flowchart of a method for determining a maximum value (e.g. global maximum of the set of data blocks b0-b9) of an attribute e.g. 131B of data table 127 (also referred to as infimum). FIG. 3 shows for exemplification purpose a set of 10 data blocks of data table 127. For example, the maximum value may be determined for data stored in the data table 127.

Step 301 corresponds to step 201 of FIG. 2 (i.e. in step 301, step 201 is performed).

In step 303, a second reference value μ 322 may be determined as the largest value of the set of minimum values min(b0)-min(b9) of the extremum set. The set of minimum values min(b0)-min(b9) may be ordered so as to identify or select the second reference value as the largest of the set of minimum values. As shown in FIG. 3 the largest minimum value is min(b7) which is the minimum value of the data block b7 referred to as μ 322.

The data block b7 that corresponds to the determined second reference value contains at least one row or entry having an attribute value of the attribute 131B that is equal to or higher than μ 322. The determined μ 322 may thus be a lower bound for the maximum value (or global maximum) of the set of data blocks b0-b9 to be determined.

In step 305, a second subset (b0, b2, b5, b7, and b8) of the set of data blocks b0-b9 may be selected among the set of data blocks b0-b9. Each of the second subset of the set of data blocks has a respective maximum value of the attribute that is higher than the second reference value μ 322. For example, the second subset of data blocks may include data blocks b7, b8, b5, b2 and b0 as they have respective maximum values max(b7), max(b8), max(b5), max(b2) and max(b0) higher than μ 322.

In step 307, at least part of the second subsets of data blocks b7, b8, b5, b2, and b0 may be processed for identifying the maximum value of the set of data block b0-b9. In other words, in order to determine the maximum value of the attribute 131B of the whole set of data blocks b0-b9 only those determined second subset of data blocks are scanned for determining the maximum value of the set of data blocks b0-b9. This may have the advantage of saving processing resources compared to the case where the whole data table 127 is to be processed.

The processing of step 307 may for example be performed as follows. Assuming for example that the processing is performed e.g. in a random order, starting from b5, b2, b8, b7 and then b0. After processing b5 and before processing b2 it may be determined if the maximum of the attribute 131B in data block b2 max(b2) is higher than max(b5) which is the current maximum value of the attribute 131B in data block b5 e.g. as determined after scanning b5. Since max(b2) is higher than current max(b5) data block b2 may be processed or scanned for determining the maximum value of the attribute 131B in the set of data blocks b0-b9. After processing b2 ((e.g. and current max(b2) may be determined which may be equal to the max(b1) in the attribute value information) and before processing b8 it may be determined if the maximum of the attribute 131B in data block b8 max(b8) is higher than max(b2) (because max(b2) is the highest maximum of the previously processed data blocks b2 and b5). Since max(b8) is smaller than max(b2) data block b8 may not be processed or scanned (i.e. skipped) for determining the maximum value of the attribute 131B in the set of data blocks b0-b9. Before processing b7 it may be determined if the maximum of the attribute 131B in data block b7 max(b7) is higher than max(b2) (because max(b2) is the highest maximum of the previously processed data blocks b2, b8 and b5 e.g. if max(b7) is compared with max(b5) the result of the comparison may be different and may be processed). However, since max(b7) is smaller than max(b2) data block b7 may not be processed or scanned (i.e. skipped) for determining the maximum value of the attribute 131B in the set of data blocks b0-b9. Before processing b0 it may be determined if the maximum of the attribute 131B in data block b0 max(b0) is higher than max(b2). Since max(b0) is smaller than max(b2) data block b0 may not be processed or scanned (i.e. skipped) for determining the maximum value of the attribute 131B in the set of data blocks b0-b9.

In another example, the processing of step 207 may be performed as follows. The maximum values max(b5), max(b2), max(b8), max(b7) and max(b0) of second subsets of data blocks b5, b2, b8, b7 and b0 may be sorted in descending order (b2-->b7→b5-->b0-->b8). In this case, the first ranked or ordered data block b2 may be processed or scanned in order to determine the maximum value of the attribute 131B in data block b2 and if the current maximum value max(b2) is higher than max(b7) then this max(b2) is the maximum value of the set of data blocks b0-b9 otherwise b7 is processed and compared with b5 and so on.

Figure 4:
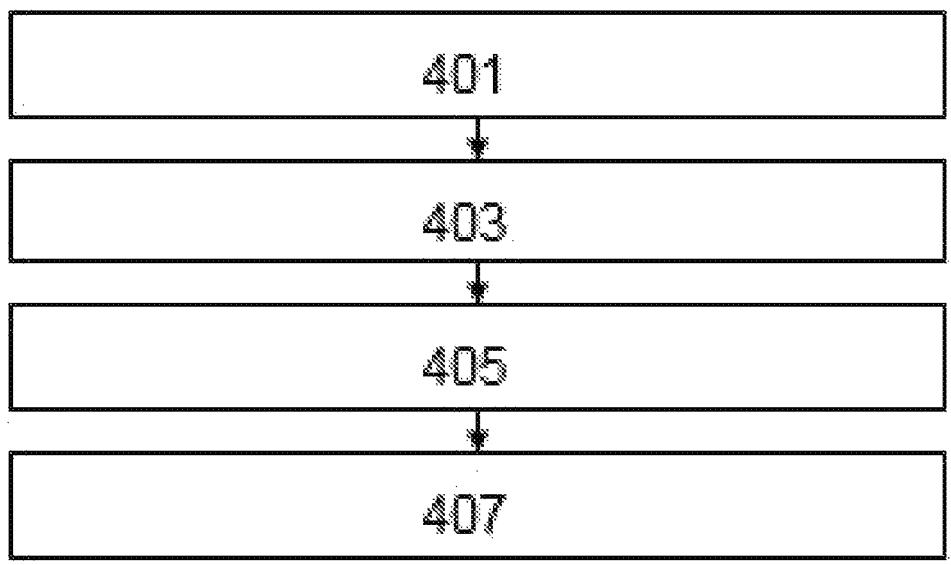
FIG. 4 is a flowchart of a method for determining minimum and maximum values of an attribute in a data table.

FIG. 4 is a flowchart of a method for determining extremum values (e.g. global maximum and global minimum of the set of data blocks b0-b9) of an attribute e.g. 131B of data table 127. FIG. 4 shows for exemplification purposes a set of 10 data blocks of data table 127. For example, the maximum value may be determined for data stored in the data table 127.

Step 401 corresponds to step 201 of FIG. 2 (i.e. in step 401, step 201 is performed).

In step 403, steps 203 and 303 may be performed e.g. in parallel or concurrently or in sequence.

In step 405, steps 205 and 305 may be performed e.g. in parallel or concurrently or in sequence.

In step 407, at least part of the first and second subsets of data blocks may be processed for identifying the extremum values of the attribute 131B in the set of data block b0-b9. For example, step 407 may include performing steps 207 and 307 e.g. in parallel or concurrently or in sequence.

In another example, step 407 may be performed as follows.

Common data blocks between the first and second subsets of data blocks may first be determined. The common data blocks may be processed for determining both the minimum value and the maximum value of the attribute 131B in the set of data blocks b0-b9. Further, the determined common data blocks may be excluded or removed from the first and second subset of data blocks to obtain a modified first and modified second subset of data blocks respectively. Next, the modified first subset of data blocks may be processed to determine the minimum value of the attribute 131B in the set of data blocks b0-b9. And, the modified second subset of data blocks may be processed to determine the maximum value of the attribute 131B in the set of data blocks b0-b9. The two obtained minimum (maximum) values from processing the common data blocks and modified first (second) subset of data blocks may be compared in order to obtain the final global minimum (maximum) of the attribute 131B in the set of data blocks b0-b9. This may save processing resources compared to the case where the common data blocks are twice scanned for determining the minimum of the attribute 131B in the set of data blocks b0-b9, and for determining the maximum of the attribute 131B in the set of data blocks b0-b9.

Figure 5:
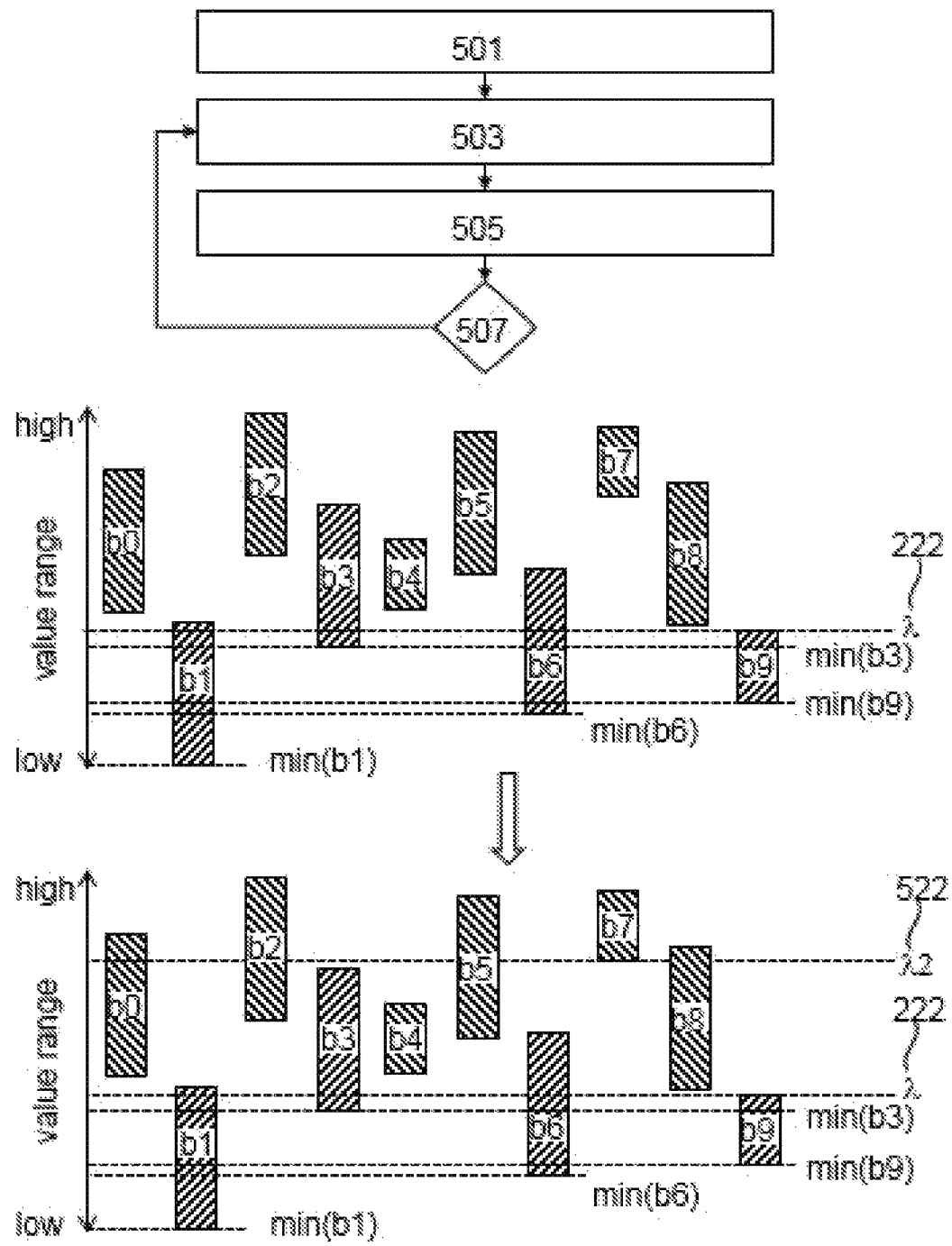
FIG. 5 is a flowchart of a method for processing a query in accordance with an example of the present disclosure.

FIG. 5 is a flowchart of a method for processing a query in accordance with an example of the present disclosure.

In step 501, a query for determining the minimum value of the attribute 131B in the data table 127. The query indicates a predefined condition (e.g. Age>48 or ID!=3 etc.). Step 201 of FIG. 2 may be performed before or after step 501.

In step 503, step 203 may be performed as described above in order to determine the first reference value of the set of data blocks b0-b9.

In step 505, a first subset of data blocks (b1, b3, b6, and b9) of the set of data blocks may be selected among the set of data blocks b0-b9 as described with reference to step 205 of FIG. 2. And it may be determined (decision block 507) if the first subset of data blocks (b1, b3, b6 and b9 satisfies the predefined condition (e.g. Age>48). In case, none of the first subset of data blocks (b1, b3, b6 and b9) satisfies the predefined condition, steps 503 and 505 may be repeated using a further set of data blocks (e.g. remaining data blocks b0, b2, b4, b5, b7 and b8) of the data table 127 as the set of data blocks. In other words, step 503 may be executed to determine the first reference value of the set of data blocks b0, b2, b4, b5, b7, and b8. That is, the extremum set of step 201 may be reduced from the attribute value information of the first subset of data blocks b1, b3, b6 and b9, and step 503 may be performed using this reduced extremum set. As shown in FIG. 5, the smallest maximum value $\lambda 2$ 522 is max(b4) the maximum value of the data block b4 of the current set of data blocks b0, b2, b4, b5, b7 and b8. Step 505 may be executed to determine the first subset of data blocks of the current set of data blocks b0, b2, b4, b5, b7 and b8, as described with reference to step 205 of FIG. 2. In this iteration, the first subset of data blocks includes b0, b2, b4, b5 and b8 (excluding b7 as its minimum value is higher than max(b4)). The repeating of steps 503-507 may be performed until at least part of the first subset of data blocks (of a given iteration) satisfies the predefined condition or all data blocks of the data table 127 are processed. This iteration approach may be used to determine the maximum value as well.

In the following, examples of the present disclosure will be described.

Example Method 1

As the only access method in many analytical databases is a table scan, scan performance is critical. To speed up scan performance, analytical database systems often store information on blocks of data. The present method may exploit the attribute value information 220.0-9 for computing the minimum or maximum value of a column or attribute e.g. 131B. The present method may preselect only those data blocks that potentially contain the minimum or maximum and subsequently scan only those.

The attribute value information does not guarantee that these values (still) exist in a data block, as updates or deletes of the minimum or maximum value may happen. This is because deleting the minimum or maximum row would otherwise require to scan the modified data block for the new minimum or maximum values. This would make updates and deletes a lot more expensive. As a consequence, the attribute value information 220.0-9 may degrade over time and only constitutes a guaranteed lower and upper bound of the values of the attribute 131B in the respective data block. It is assumed, however, that every data block b0-b9 contains at least one (valid) row within these lower and upper bounds.

The global minimum in the set of data blocks b0-b9 (i.e. minimum value of the attribute 131B in the set of data blocks b0-b9) may be determined as follows:

1. The smallest maximum value of the set of data blocks b0-b9 $\lambda$ 222 is determined. The corresponding data block contains at least one row that is equal to or less than $\lambda$ 222. $\lambda$ may thus be an upper bound for the global minimum. Note that $\lambda$ may not necessarily be the maximum value of the data block with the smallest minimum value.
2. All data blocks are determined which, according to attribute value information 220.0-9, may contain rows that are smaller than to $\lambda$. The global minimum value is contained in one of these data blocks (that can form a scan list).
3. Only those determined or selected data blocks are scanned for the minimum value of the attribute 131B in the set of data blocks b0-b9.

As shown in FIG. 2, the smallest maximum value is the one of data block b9, so this value is used for $\lambda$. The minimum values of attribute 131B in data blocks b1, b3, b5, b6, and b9 are less than $\lambda$, i.e. they may contain rows that have values of the attribute 131B smaller than $\lambda$. One of these rows corresponds to the global minimum. Thus, only these data blocks b1, b3, b6 and b9 need to be scanned. In addition to that, if while scanning through the selected data blocks a temporary minimum value (of attribute 131B) has been found that is smaller than the minimum value of a data block bi, then bi cannot contain a smaller value (minimum value of given data block means the minimum value of the attribute 131B in that data block). Consequently, bi does not need to be scanned at all. If, for example, in data block b1 of FIG. 2 a value smaller than min(b6) is found, then data blocks b3, b6 and b9 can be skipped, if they have not been processed yet. The global maximum value can be computed in analogous manner. For the sake of a simpler presentation, only the computation of the minimum is described in these examples.

Early Out Method

If the current minimum value $v_{min}$ found in the scanned data blocks so far is smaller than the minimum of other blocks, these can be skipped. This is best achieved by processing all data blocks not in their storage order, but in the order of their minimum values. If out-of-order processing is efficient, e.g. all required data blocks are available in the buffer pool or generally in main memory, this is the preferred way. Yet, if loading the data blocks in sequential storage order is faster (as is usually the case with disks), data blocks should be buffered as far as possible. Then, the data blocks are processed from the buffer, ordered by minimum. For example, in DB2 multiple pages reside in an extent that is usually configured to disk stride size. In such a setup, all required data blocks of an extent should be loaded and processed out of order.

The Early Out method may include:
1. The data blocks that are to be processed (e.g. the selected subset of data blocks of step 205 and/or step 305) are scanned—in any order, but ordered by minimum values of the attribute 131B may work better, as described.
2. The current data block is completely scanned and searched for the minimum $v_{min}$.
3. Before a new data block bi is started, its minimum value min(bi) is compared with $v_{min}$. If $v_{min}$<min(bi), then bi is not scanned.
4. If the data blocks in the scan list are ordered by minimum value (min(bi)) and $v_{min}$≤min(bi), then $v_{min}$ constitutes the global minimum value at this point and processing ends. Otherwise, the next data block is examined and so forth.

This effectively executes linear search on the attribute values information 220.0-9 with the condition $v_{min}$>min(bi). This may particularly be advantageous if the selected data blocks number or size is not large. However, if the attribute value information of the selected data blocks is sorted by minimum value (min(bi)), more efficient search algorithms, such as binary search or interpolation search, can be applied alternatively.

Queries Involving Selections or Restrictions

Example method 1 is capable of computing the global minimum, as queried in the following SQL statement:
SELECT MIN(x) FROM a
where a may be the data table e.g. 127.

The example method 1 may rely on the assumption, that every data block (to be scanned/processed) contains at least one valid row. However, this may change if the query (e.g. of FIG. 5) contains restrictions, such as the following:
SELECT MIN(x) FROM a WHERE y='ABC' AND z>50

The restrictions may even discard all rows thus producing a query result of MIN(0), i.e. NULL.

For min-queries as the one above with restrictions, first of all, attribute value information 220.0-9 should be consulted to assign to every data block one of the following categories:
1. Data blocks which cannot contain matching rows for the query. These data blocks are ignored right away.
2. Data blocks which only contain matching rows. For these data blocks, the assumption, that every data block contains at least one valid row, is true.
3. Data blocks which may contain matching rows. For these data blocks, the assumption, that every data block contains at least one valid row, may not be true.

The smallest maximum value of a data block from the second category is an upper bound for the queried minimum. It can thus be used as λ and the approach described above can be applied. It is, however, possible, that no data blocks of the second category exist for the query. In this case, all data blocks can be initially added to the scan list, i.e. λ=∞. Thus, only through early out method data, blocks may be skipped. Alternatively, example method 1 is repeatedly applied until the minimum value has been found or all rows have been processed.

Iterative Minimum Search

In example method 1, the assumption that every data block contains at least one valid row between the lower and upper bounds stated in the attribute value information 220.0-9 is formulated. Moreover, as described above, due to query restrictions the assumption may not hold, either. This can be addressed by applying the example method 1 iteratively. As described above the example method 1 determines the smallest maximum value λ of the attribute 131B in the set of data blocks and selects all data blocks from the set of data blocks that intersect (e.g. strictly smaller than) λ. These selected data blocks are scanned for the minimum. If these data blocks do not contain any valid rows for the query, the approach can be repeated. Ignoring all data blocks that have already been scanned, again the smallest maximum value λ2 is determined and again all data blocks that intersect (strictly smaller than) the new k2 are scanned.

In the example of FIG. 2, the first iteration processes all grey blocks b1, b3, b6, and b9. After this, the smallest maximum value is λ2=max(b4). Thus, in the second iteration data blocks b0, b2, b4, b5, and b8 are scanned, as they have attribute values smaller than λ2.

Joins

Similar to restrictions of the SELECT query described above, Joins may discard rows from data blocks, so that the assumption, that every data block contains at least one valid row, may not be true. Queries, such as the following, may return NULL, because no rows survived the join:
SELECT MIN(a.x) FROM a JOIN b ON a.y=b.y Iterative minimum search is applicable for joins as well. The first set of data blocks intersecting the first value of λ is scanned and joined with the other table. If no result has been produced of the join, λ2 is determined and the next set of data blocks that interests with λ2 is joined, etc.

Hash Joins

The predominant join type in analytical database systems is the hash join. Hash joins are usually executed so that the smaller table is the inner table, i.e. the one from which the hash table is built up. The present method may reduce the number of data blocks to process, so that usually only few data blocks of the table owning the minimum column (table a in the above example) are processed. Consequently, the rows from these data blocks would be used to build the hash table against which the other table would be probed.

This is a favorable approach if the min/max ranges of the selected data blocks are capable of eliminating a large fraction of the other table, through evaluation of the attribute value information 220.0-9. In this case, the hash table would be small, and thus efficient, and scanning the other table repeatedly may not be an issue, as (1) only a fraction would be scanned and (2) in every iteration a largely different part of the table would be scanned.

However, if the selected data blocks do not restrict the data blocks of the other table, the other table is small enough to be kept in main memory, and the join is estimated to be selective (i.e. to discard a large fraction), it may be favorable to build the hash table from the other table. Then, following iterative minimum search, sets of data blocks are probed against the hash table until the minimum has been found.

Merge Joins

Two similar approaches can be applied for (sort-) merge joins. In case attribute value information is capable of determining a small subset of the other table that contains all possible join matches for the selected data blocks of the current iteration, this subset is sorted and joined. If no minimum has been found yet, the next set of data blocks is determined using $\lambda 2$ and so on.

Otherwise, the other table is sorted either fully or up to the maximum value of the selected set of data blocks. These blocks are sorted (by join column, of course) and joined with the other table. However, the sorted rows of the other table that are larger than $\lambda$ are kept. If no minimum could be computed because no rows survived the join, a new set of data blocks is selected, sorted and joined with the kept sorted rows of the other table, etc.

Outer Joins

Left, right, and full outer joins are an exception, as they never discard rows from an outer table. If the minimum is to be computed on a column of an outer table, such as in the following examples, then our approach of Section 2 can be applied.

SELECT MIN(a.x) FROM a LEFT OUTER JOIN b ON a.y=b.y

SELECT MIN(b.z) FROM a RIGHT OUTER JOIN b ON a.y=b.y

SELECT MIN(a.x) FROM a FULL OUTER JOIN b ON a.y=b.y

The upper bound $\lambda$ is determined as described in example method 1. Only those data blocks that intersect it need to be scanned and fed to the join.

Another example for determining the extremum values e.g. the minimum value of the set of data blocks may include: 1. find a data block of the set of blocks b0-b9 having MIN(of minimum values in the extremum set 220.0-9) smallest value of the minimums, 2. find actual minimum value in the data block identified from 1 and 3. find all data blocks where MIN(data block)<actual minimum from 2. and scan those data blocks to find possibly lower min value.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer implemented method for determining an extremum value of an attribute of a first data table, wherein the first data table includes at least a set of data blocks, the method comprising:
    generating a multidimensional data structure for representing the set of data blocks;
    assigning, by a computer, to each data block of the set of data blocks a plurality of attribute value information indicative of a range of a plurality of values of an attribute in the data block, wherein assigning results in an extremum set of a plurality of indicative maximum values of the attribute and a plurality of indicative minimum values of the attribute;
    determining a reference value as an infimum or a supremum of the extremum set based on each extremum in the extremum set;
    in case the extremum is a minimum, selecting a subset of the set of data blocks, wherein each data block within the subset has a respective minimum value of the attribute that is smaller than the reference value;
    in case the extremum is a maximum, selecting a subset of the set of data blocks, wherein each data block within the subset has a respective maximum value of the attribute that is higher than the reference value;
    receiving a second data table;
    joining the selected subset of data blocks with the received second data table;
    sorting the joined subset of data blocks; and
    processing at least a part of the joined subset of data blocks for identifying an extremum value.

2. The method of claim 1, wherein, in case the extremum being a minimum, processing of the selected subset of data blocks further comprises:
    processing a current data block of the subset of data blocks only in response to determining that the respective minimum value of the attribute of the current data block is smaller than a minimum value of a previously processed data block of the subset of data blocks.

3. The method of claim 1, wherein, in case the extremum being a maximum, processing of the subset of data blocks further comprises:
    processing a current data block of the subset of data blocks only in response to determining that the respective maximum value of the attribute of the current data block is higher than a maximum value of a previously processed data block of the subset of data blocks.

4. The method of claim 1, wherein, in case the extremum being a minimum, processing of the subset of data blocks further comprises:
    sorting, in an ascending order, the subset of minimum values of the subset of data blocks;
    processing a first ordered data block for identifying the minimum value;
    in case the identified minimum value is smaller than the minimum value of the following data block, using the identified minimum value as the extremum value to be determined; and
    in case the identified minimum value is not smaller than the minimum value of the following data block, processing and using a subsequent ordered data block.

5. The method of claim 1, wherein, in case the extremum being a maximum, processing of the subset of data blocks further comprises:
    sorting, in a descending order, the subset of maximum values of the subset of data blocks;
    processing a first ordered data block for identifying the maximum value;
    in case the identified maximum value is higher than the maximum value of the following data block, using the identified maximum value as the extremum value to be determined; and
    in case the identified maximum value is smaller than the maximum value of the following data block, processing and using a subsequent ordered data block.

6. The method of claim 1, further comprising:
receiving a query for determining the extremum value, wherein the query indicates a predefined condition of an attribute of the first data table, and wherein the selecting of the subset of data blocks further comprises:
in response to determining that the subset of data blocks does not additionally satisfy the predefined condition, repeating determining the reference value and selecting the subset using the extremum set without the plurality of extremum values of the subset of the plurality of data blocks, wherein repeating is performed until at least part of the subset of the plurality of data blocks satisfies the predefined condition or until all of the plurality of data blocks of the first data table have been processed.

7. The method of claim 1, further comprising:
receiving a request for determining the minimum value of the attribute in a joined table resulting from a join of the first data table and the second data table, and processing comprising:
in response to determining that the at least part of the subset of data blocks is empty, repeating determining the reference value and selecting the subset using the extremum set without the plurality of extremum values of the subset of the plurality of data blocks, wherein the repeating being performed until the at least part of the subset of the plurality of data blocks is not empty or until all of the plurality of data blocks of the first data table have been processed.

8. The method of claim 1, wherein the first data table being stored on a disk storage.

9. The method of claim 1, wherein the first data table being an in-memory data table.

10. A computer system for determining extremum values of an attribute of a first data table, wherein the first data table includes at least a set of data blocks; the computer system being configured for:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
generating a multidimensional data structure for representing the set of data blocks;
assigning to each data block of the set of data blocks a plurality of attribute value information indicative of a range of values of an attribute in the data block, wherein assigning results in an extremum set of a plurality of indicative maximum values and a plurality of indicative minimum values of the attribute;
determining a first reference value as a supremum of the extremum set;
determining a second reference value as an infimum of the extremum set;
selecting a first subset of the set of data blocks, wherein each data block within the first subset has a respective minimum value of the attribute that is smaller than the first reference value;
selecting a second subset of the set of data blocks, wherein each data block within the second subset has a respective maximum value of the attribute that is higher than the second reference value;
receiving a second data table;
joining the selected first subset of data blocks and the second subset of data blocks with the received second data table;
sorting the joined first subset of data blocks and the joined second subset of data blocks; and
processing at least part of the joined first subset or at least a part of the joined second subset for identifying a plurality of extremum values.

11. The computer system of claim 10, wherein processing at least part of the subset of the first subset and at least a part of the second subset further comprises:
determining a plurality of common data blocks between the first subset of data blocks and the second subset of data blocks;
processing the plurality of common data blocks for identifying both a plurality of minimum values and a plurality of maximum values, thereby obtaining a first minimum value and a first maximum value;
processing the first subset of the plurality of data blocks excluding the plurality of common data blocks for identifying a second minimum value;
processing the second subset of the plurality of data blocks excluding the plurality of common data blocks for identifying a second maximum value; and
selecting a smallest of the first minimum value and the second minimum value and a largest of the first maximum value and the second maximum value.

12. A computer program product for determining an extremum value of an attribute of a first data table, wherein the first data table includes at least a set of data blocks, the computer program product comprising:
one or more computer-readable tangible storage medium and program instructions stored on at least one of the one or more tangible storage medium, the program instructions executable by a processor, the program instructions comprising:
program instructions to generate a multidimensional data structure for representing the set of data blocks;
program instructions to assign to each data block of the set of data blocks a plurality of attribute value information indicative of a range of a plurality of values of an attribute in the data block, wherein assigning results in an extremum set of a plurality of indicative maximum values and a plurality of indicative minimum values of the attribute;
program instructions to determine a reference value as an infimum or a supremum of the extremum set based on each extremum in the extremum set;
in case the extremum is a minimum, program instructions to select a subset of the set of data blocks, wherein each data block within the subset has a respective minimum value of the attribute that is smaller than the reference value;
in case the extremum is a maximum, program instructions to select a subset of the set of data blocks, wherein each data block within the subset has a respective maximum value of the attribute that is higher than the reference value;
program instructions to receive a second data table;
program instructions to join the selected subset of data blocks with the received second data table;
program instructions to sort the joined subset of data blocks; and
program instructions to process at least a part of the joined subset of data blocks for identifying an extremum value.

13. The computer program product of claim 12, wherein, in case the extremum being a minimum, processing of the subset of data blocks further comprises:

program instructions to process a current data block of the subset of data blocks only in response to determining that the respective minimum value of the attribute of the current data block is smaller than a minimum value of a previously processed data block of the subset of data blocks.

14. The computer program product of claim 12, wherein, in case the extremum being a maximum, processing of the subset of data blocks further comprises:

program instructions to process a current data block of the subset of data blocks only in response to determining that the respective maximum value of the attribute of the current data block is higher than a maximum value of a previously processed data block of the subset of data blocks.

15. The computer program product of claim 12, wherein, in case the extremum being a minimum, processing of the subset of data blocks further comprises:

program instructions to sort, in an ascending order, the subset of minimum values of the subset of data blocks;

program instructions to process a first ordered data block for identifying the minimum value;

in case the identified minimum value is smaller than the minimum value of the following data block, program instructions to use the identified minimum value as the extremum value to be determined; and in case the identified minimum value is higher than the minimum value of the following data block, program instructions to process and use a subsequent ordered data block.

16. The computer program product of claim 12, wherein, in case the extremum being a maximum, processing of the subset of data blocks further comprises:

program instructions to sort, in a descending order, the subset of maximum values of the subset of data blocks;

program instructions to process a first ordered data block for identifying the maximum value;

in case the identified maximum value is higher than the maximum value of the following data block, program instructions to use the identified maximum value as the extremum value to be determined; and in case the identified maximum value is smaller than the maximum value of the following data block, program instructions to process and use a subsequent ordered data block.

17. The computer program product of claim 12, further comprising:

program instructions to receive a query for determining the extremum value, wherein the query indicates a predefined condition of an attribute of the first data table, and wherein selecting of the subset of data blocks further comprises:

in response to determining that the subset of data blocks does not additionally satisfy the predefined condition, program instructions to repeat determining the reference value and selecting the subset using the extremum set without the plurality of extremum values of the subset of the plurality of data blocks, wherein repeating is performed until at least part of the subset of the plurality of data blocks satisfies the predefined condition or until all of the plurality of data blocks of the first data table have been processed.

18. The computer program product of claim 12, further comprising:

program instructions to receive a request for determining the minimum value of the attribute in a joined table resulting from a join of the first data table and the second data table, and processing comprising:

in response to determining that the at least part of the subset of data blocks is empty, program instructions to repeat determining the reference value and selecting the subset using the extremum set without the plurality of extremum values of the subset of the plurality of data blocks, wherein repeating is performed until the at least part of the subset of the plurality of data blocks is not empty or until all of the plurality of data blocks of the first data table have been processed.

19. The computer program product of claim 12, wherein the first data table being stored on a disk storage.

20. The computer program product of claim 12, wherein the first data table being an in-memory data table.

* * * * *